United States Patent
Zhou et al.

(10) Patent No.: US 9,288,083 B2
(45) Date of Patent: Mar. 15, 2016

(54) ENHANCED LATTICE REDUCTION SYSTEMS AND METHODS

(75) Inventors: Qi Zhou, Atlanta, GA (US); Xiaoli Ma, Norcross, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 1004 days.

(21) Appl. No.: 13/424,079

(22) Filed: Mar. 19, 2012

(65) Prior Publication Data

US 2012/0236968 A1 Sep. 20, 2012
US 2013/0022155 A2 Jan. 24, 2013

Related U.S. Application Data

(60) Provisional application No. 61/453,623, filed on Mar. 17, 2011.

(51) Int. Cl.
*H04L 25/02* (2006.01)
*H04L 25/03* (2006.01)
*H04L 25/06* (2006.01)
*H04B 7/04* (2006.01)

(52) U.S. Cl.
CPC .......... *H04L 25/0244* (2013.01); *H04B 7/0413* (2013.01); *H04L 25/03114* (2013.01); *H04L 25/067* (2013.01)

(58) Field of Classification Search
None
See application file for complete search history.

(56) References Cited

U.S. PATENT DOCUMENTS

| | | | | |
|---|---|---|---|---|
| 8,295,374 | B2 * | 10/2012 | Kuo | H04L 25/0204 370/329 |
| 2009/0196360 | A1 * | 8/2009 | Gan et al. | 375/260 |
| 2012/0159122 | A1 * | 6/2012 | Anderson et al. | 712/31 |
| 2012/0263261 | A1 * | 10/2012 | Gestner et al. | 375/341 |

OTHER PUBLICATIONS

R.F.H. Fischer, "Notes on Lattice-Reduction-Aided MMSE Equalization", Accepted at International Journal of Electronics and Communications (AEÜ), online arxiv.org/abs/1008.2093, Aug. 2010.*
D. Wübben, R. Böhnke, V. Kühn, K.D. Kammeyer; "Near-Maximum-Likelihood Detection of MIMO Systems using MMSE-Based Lattice Reduction", In IEEE ICC, pp. 798-802, Jun. 2004.*
X. Ma and W. Zhang, "Performance analysis for V-BLAST systems with lattice-reduction aided linear equalization", IEEE Trans. Commun., vol. 56, pp. 309-318, 2008.*
Zhang, W. and X. Ma, "A novel lattice reduction aided linear precoding scheme", in Proc. $43^{rd}$ Conf. Information Sci. Syst., Johns Hopkins University, pp. 518-523, Mar. 2009.*

* cited by examiner

*Primary Examiner* — Andrew Caldwell
*Assistant Examiner* — Matthew Sandifer
(74) *Attorney, Agent, or Firm* — Troutman Sanders LLP; Ryan A. Schneider; Dustin B. Weeks

(57) ABSTRACT

An exemplary embodiment of the present invention provides a lattice reduction method comprising obtaining a preliminary estimate of a transformation matrix, generating a covariance matrix based on the preliminary estimate of the transformation matrix, reducing diagonal elements of the covariance matrix to generate a unimodular transformation matrix, and using the unimodular transformation matrix to obtain an estimate of an input.

20 Claims, 17 Drawing Sheets

Input: H, Output: $\tilde{H}$, T

(1) $\tilde{C} = (H^{\mathcal{H}} H)^{-1}$, $T' = I_N$ (2) do

(3) $\lambda_{i,k} \leftarrow -\left\lfloor \frac{\tilde{C}_{i,k}}{\tilde{C}_{i,i}} \right\rceil, \forall i \neq k$ (4) if all $\lambda_{i,k} = 0, \forall i \neq k$ (5) break

(6) end if

(7) Find the largest reducible $\tilde{C}_{k,k}$ (8) Choose $i = \arg\max_{\tilde{i}} R_{\tilde{i},k}$ (9) $t'_k \leftarrow t'_k + \lambda_{i,k} t'_i$

(10) $\tilde{c}_k \leftarrow \tilde{c}_k + \lambda_{i,k} \tilde{c}_i$

(11) $\tilde{c}^{(k)} \leftarrow \tilde{c}^{(k)} + \lambda^*_{i,k} \tilde{c}^{(i)}$

(12) while (true)

(13) $T = (T'^{-1})^{\mathcal{H}}$, $\tilde{H} = HT$

FIG. 2

ENHANCED LATTICE REDUCTION SYSTEMS AND METHODS

CROSS-REFERENCE TO RELATED APPLICATIONS

This application claims the benefit of U.S. Provisional Application Ser. No. 61/453,623, filed on 17 Mar. 2011, which is incorporated herein by reference in its entirety as if fully set forth below.

TECHNICAL FIELD OF THE INVENTION

Embodiments of the present invention relate generally to signal processing systems and methods and, more particularly, to systems, devices, and methods for lattice reduction.

BACKGROUND OF THE INVENTION

Multiple-Input Multiple-Output ("MIMO") communication systems are becoming increasingly popular as a solution to increasing demands for higher data-rates and more reliable wireless communication systems. These systems comprise multiple antennas at a transmitter side of the communication system and multiple antennas at the receiver side of the communication system. Each transmitter antenna can transmit a different signal at a common frequency through a different channel of the communication system. Each receiver antenna may receive each signal from the multiple transmitter-antennas. During transit, the transmitted signals may encounter different obstacles such that the frequency response of each channel is different. The plurality of channels used in the transmission of symbols from the plurality of transmitter antennas to the plurality of receiver antennas together form a channel matrix. The input-output relationship of a typical MIMO system can be represented by Equation 1.

$$y=Hs+w \qquad \text{Equation 1:}$$

In Equation 1, y represents an M×1 output vector received by the receiver antennas, s represents an N×1 input symbol vector transmitted by the transmitter antennas, H represents an M×N channel matrix, and w represents an unknown noise vector.

A common goal of conventional systems is to attempt to efficiently detect the transmitted symbol vector s by determining frequency response of each channel in the communication system, i.e. accurately estimating the channel matrix H.

It can be assumed that the elements of noise vector w are independently distributed with each entry of the noise vector being a random variable with zero mean and variance $\sigma_\omega^2$. Given the known distribution of the noise vector, the optimal solution to the MIMO symbol detection problem is Maximum Likelihood ("ML") detection. ML detection, however, requires an exhaustive search over all possible transmitted symbol vectors, requiring high computational complexity. This approach is infeasible for hardware implementations when either a large signal constellation or a large number of transmit and receive antennas are employed. Hence, a goal of conventional systems is to design hardware for MIMO symbol detection that achieves comparable Bit-Error-Rate ("BER") performance to the ML detector while having low hardware complexity and meeting throughput and latency requirements, especially as the size of the MIMO system increases.

Some conventional MIMO symbol detections systems employ methods of linear detection and Successive Interference Cancelation ("SIC"). Because most of the required processing for these detectors need only occur at the maximum packet-rate (preprocessing) and the required symbol-rate processing has relatively low-complexity, the throughput requirements for certain wireless standards, such as 802.11n, can be achieved in these systems. These conventional systems, however, do not collect the same diversity (negative logarithmic asymptotic slope of the BER versus Signal-to-Noise-Ratio ("SNR") curve) as ML detection. As a result, these methods exhibit greatly reduced system performance compared to ML detectors Other conventional symbol detection systems employ Sphere Decoding ("SD") algorithms. Hardware implementations of SD algorithms can achieve ML or near-ML performance. Unfortunately, these methods exhibit greatly increased symbol-rate processing complexity compared to linear or SIC detectors. The complexity of SD methods can also vary widely with changing channel conditions.

The maximum packet-rate of 802.11n is considerably less than the symbol-rate. Therefore, it is desirable to obtain detection systems and methods that achieve ML or near-ML performance at the cost of increased preprocessing complexity as opposed to increased symbol-rate processing complexity. Systems having these desired characteristics include Lattice Reduction ("LR") aided detectors, which, unlike SD methods, incorporate LR algorithms into the preprocessing part of linear or SIC detectors and increase the symbol-rate processing complexity slightly. Specifically, LR systems and methods employ lattice reduction once per received packet (per subcarrier). LR-aided detectors also exhibit the desirable property of having a complexity that is independent of both the channel SNR and signal constellation (assuming individual arithmetic operations have O(1) complexity).

A variety of hardware realizations of LR-aided detectors have been explored to exploit these properties and to achieve near-ML performance. Various explorations have included a VLSI implementation of a simplified Brun's LR algorithm and a software implementation of Seysen's LR algorithm on a reconfigurable baseband processor. Other conventional LR-aided detectors employ variations the Complex Lenstra-Lenstra-Lovász ("CLLL") LR algorithm. Unfortunately, the performance of these conventional LR-aided detectors decreases and their complexity increases as the size of the MIMO system increases, i.e. the number of transmitter and receiver antennas increases.

Accordingly, there is a desire for more efficient and less complex LR-aided detection systems and methods. Various embodiments of the present invention address these desires.

BRIEF SUMMARY OF THE INVENTION

The present invention relates to enhanced LR systems and methods. An exemplary embodiment of the present invention provides a LR method comprising obtaining a preliminary estimate of a transformation matrix, generating a covariance matrix based on the preliminary estimate of the transformation matrix, reducing diagonal elements of the covariance matrix to generate a unimodular transformation matrix, and using the unimodular transformation matrix to obtain an estimate of an input. In an exemplary embodiment of the present invention, the method further comprises obtaining a signal at a plurality of input terminals, the signal representing the input linearly transformed by the transformation matrix. In some exemplary embodiments of the present invention, the method further comprises repeating the step of reducing the diagonal elements until the diagonal elements of the covariance matrix are no longer reducible. In an exemplary embodiment of the present invention, the input comprises a symbol vector. In another exemplary embodiment of the present invention, the transformation matrix comprises a channel matrix.

In an exemplary embodiment of the present invention, reducing diagonal elements of the covariance matrix comprises reducing a largest reducible diagonal element of the covariance matrix. In another exemplary embodiment of the present invention, reducing diagonal elements of the covariance matrix comprises reducing a smallest reducible diagonal element of the covariance matrix. In yet another exemplary embodiment of the present invention, reducing diagonal elements of the covariance matrix comprises reducing a random reducible diagonal element of the covariance matrix. In still yet another exemplary embodiment of the present invention, reducing diagonal elements of the covariance matrix comprises minimizing cost by reducing a reducible diagonal element of the covariance matrix requiring the least cost to be found. Further, in some exemplary embodiments of the present invention, reducing diagonal elements of the covariance matrix comprises an iterative process.

Another exemplary embodiment of the present invention provides a LR method comprising obtaining a preliminary estimate of a transformation matrix, generating a covariance matrix based on the preliminary estimate of the transformation matrix, and reducing diagonal elements of the covariance matrix to generate a unimodular transformation matrix. In yet another exemplary embodiment of the present invention, obtaining a preliminary estimate of a transformation matrix comprises accessing data from a memory.

In addition to LR methods, the present invention is directed to LR systems. An exemplary embodiment of the present invention provides a LR system comprising a plurality of input terminals, a processor, and logic. In some exemplary embodiments of the present invention, the plurality of input terminals can be configured to obtain a signal, the signal representing an input transformed by a transformation matrix. In some exemplary embodiments of the present invention, the logic can be stored in a non-transitory computer readable media that can be executed by the processor. In an exemplary embodiment of the present invention, execution of the logic by the processor causes the system to obtain a preliminary estimate of the transformation matrix, generate a covariance matrix based on the preliminary estimate of the transformation matrix, reduce diagonal elements of the covariance matrix to generate a unimodular transformation matrix, and use the unimodular transformation matrix to obtain an estimate of the input. In some exemplary embodiments of the present invention, the logic is further configured to repeat the step of reducing diagonal elements of the covariance matrix until the diagonal elements are no longer reducible. In an exemplary embodiment of the present invention, the input can comprise a symbol vector. In another exemplary embodiment of the present invention, the transformation matrix comprises a channel matrix.

In an exemplary embodiment of the present invention, the logic can be further configured to reduce diagonal elements of the covariance matrix by reducing a largest reducible diagonal element of the covariance matrix. In another exemplary embodiment of the present invention, the logic can be further configured to reduce diagonal elements of the covariance matrix by reducing a smallest reducible diagonal element of the covariance matrix. In yet another exemplary embodiment of the present invention, the logic can be further configured to reduce diagonal elements of the covariance matrix by reducing a random reducible diagonal element of the covariance matrix. In still yet another exemplary embodiment of the present invention, the logic is further configured to minimize cost by reducing diagonal elements of the covariance matrix by reducing a reducible diagonal element of the covariance matrix requiring the least cost to be found. Further, in some exemplary embodiments of the present invention, the logic is further configured to reduce diagonal elements of the covariance matrix by iteratively reducing at least one diagonal element of the covariance matrix.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

FIG. 2 provides pseudo code for a lattice reduction method, in accordance with an exemplary embodiment of the present invention.

DETAILED DESCRIPTION OF THE INVENTION

Figure 1:
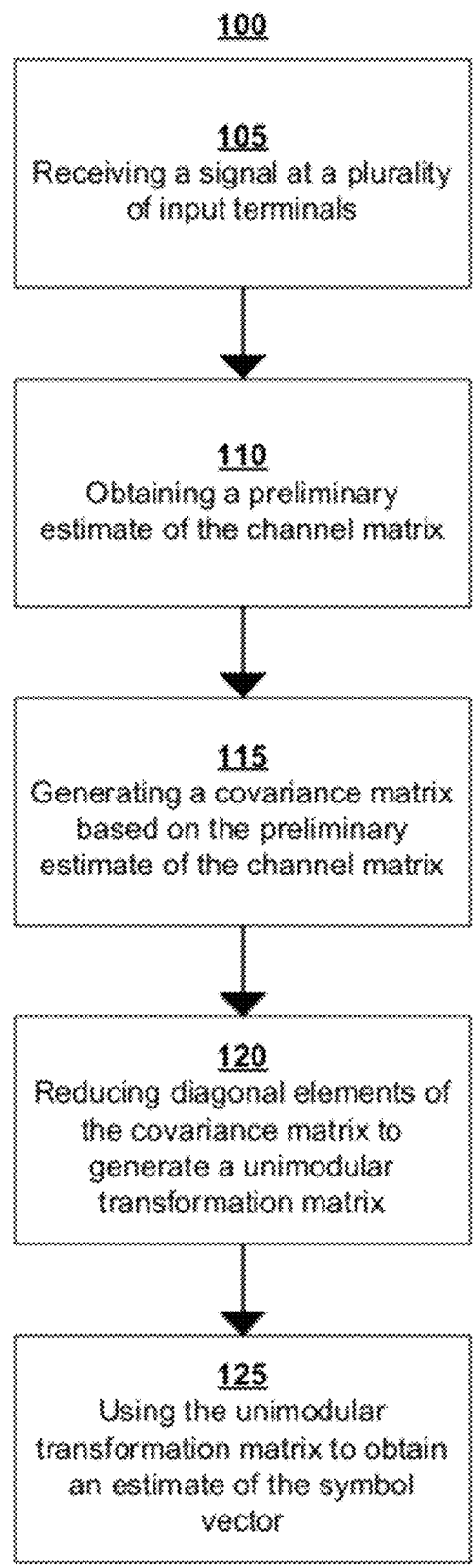
FIG. 1 provides block diagram of a lattice reduction method, in accordance with an exemplary embodiment of the present invention.

To facilitate an understanding of the principles and features of the present invention, various illustrative embodiments are explained below. In particular, the invention is described in the context of being lattice reduction systems and methods. Embodiments of the present invention can be applied to many wireless MIMO communication system standards known in the art, including, but not limited to, IEEE 802.11 (Wi-Fi), 4G, 3GPP, Long Term Evolution, Wi-MAX, HSPA+, and the like. Embodiments of the invention, however, are not limited to use in wireless MIMO communication systems. Rather, embodiments of the invention can be used for processing other MIMO communication systems, including, but not limited to, optical MIMO systems or other transmission systems having an architecture incorporating multiple transmitters and/or multiple transceivers. Embodiments of the present invention are not limited, however, to MIMO communication systems. Instead, various exemplary embodiments of the present invention can be applied to many wireless communication systems, including, but not limited to, SC-FDMA systems, GSC-FDMA systems, and the like. Additionally, various embodiments of the present invention can be applied to many systems that may benefit from employing conventional lattice reduction systems and methods, including, but not limited to, GPS systems, cryptography systems, and the like.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

A goal of LR aided detectors is to reduce the lattice basis of a transformation matrix, H, to find a "better" transformation matrix $\tilde{H}$=HT, where T is a unimodular matrix, such that entries of T and $T^{-1}$ are Gaussian integers and the determinant of T is ±1 or ±j. To find the unimodular transformation matrix T and the "better" transformation matrix $\tilde{H}$, different methods have been proposed, e.g. CLLL algorithm and Seysen's algorithm. After obtaining T, zero forcing ("ZF") equalization can be performed with the "better" transformation matrix $\tilde{H}$ as shown in Equation 2.

$$y = \tilde{H}^\dagger x = T^{-1}s + \tilde{H}^\dagger \eta = z + n \qquad \text{Equation 2:}$$

Because entries of s, T, and z are Gaussian integers, an estimate of z can be obtained by quantizing the equalized signal as shown in Equation 3.

$$\hat{z} = Q(y) \qquad \text{Equation 3:}$$

An estimate of ŝ can then be obtained by rounding Tẑ with appropriate constellation as shown in Equation 4.

$$\hat{s} = Q(T\hat{z}) \qquad \text{Equation 4:}$$

Various embodiments of the present invention provide improved LR systems and methods for determining a unimodular transformation matrix T and a transformation matrix $\tilde{H}$.

As shown in FIG. 1, an exemplary embodiment of the present invention provides an LR method 100. The method 100 comprises obtaining a signal at a plurality of input terminals 105. Unless expressly limited by its context, as used herein, the term "obtaining" indicates any of its ordinary meanings, such as sensing, measuring, generating, recording, receiving (e.g. from an antenna or another input terminal), accessing, or retrieving (e.g. from memory or another storage element). The input terminals can be many input terminals known in the art, including, but not limited to, receivers, antennas, optical inputs, data access points, pins on a chip or IC, registers or locations in memory, and the like.

The signal can represent an input s linearly transformed by a transformation matrix. As used herein, the transformation matrix mathematically represents at least a portion of the transformation of an input due to interaction with one or more devices, conditions, or the like. For example, in an exemplary embodiment, the input can comprise a symbol vector transmitted by a plurality of antennas and the transformation matrix can comprise a channel matrix with data representative of at least a portion of the transformations to one or more portions of the symbol vector by wireless transmission through a plurality of channels (e.g. as represented in Equation 1). While Equation 1 references Gaussian distributed noise, various embodiments of the present invention also apply to non-Gaussian noise, which can be approximated as a Gaussian distribution, e.g. by invoking the central limit theorem. In another exemplary embodiment of the present invention, the input can comprise an unencrypted data and the transformation matrix can comprise data representative of at least a portion of the transformations to the unencrypted data used in order to encrypt the data.

The method 100 can further comprise obtaining a preliminary estimate of the transformation matrix H 110. In an exemplary embodiment of the present invention, the preliminary estimate of the transformation matrix H can be obtained using a channel estimator. The channel estimator can be many channel estimators known in the art, including, but not limited to, a least squares channel estimator. In some embodiments of the present invention, obtaining a preliminary estimate of the transformation matrix 110 can comprise accessing data stored in memory. In some embodiments of the present invention, the data stored in memory can be representative of the preliminary estimate of the transformation matrix.

Instead of simply finding a more orthogonal channel matrix $\tilde{H}$ as in conventional methods, some enhanced LR systems and methods of the present invention obtain $\tilde{H}$ such that the asymptotic pairwise error probability ("PEP") of a detector is reduced or minimized. For example, consider the zero-forcing detector ("ZFD") represented by Equation 5.

$$\hat{s}^{ZF} = Q(H^\dagger x) = Q((H^H H)^{-1} H^H x) \qquad \text{Equation 5:}$$

Given the ZFD in Equation 5, the ith transmitted symbol $s_i$ can be erroneously detected as $\hat{s}_i \neq s_i$. The PEP given the transformation matrix H is then represented by Equation 6.

$$P(s_i \to \hat{s}_i | H) = Q\left(\sqrt{\frac{|e_{s_i}|^2}{2\sigma_\omega^2 C_{i,i}}}\right) \quad \text{Equation 6}$$

In Equation 6, $e_{s_i} = s_i - \hat{s}_i$ and $$Q(x) = (2\pi)^{-\frac{1}{2}} \int_x^\infty \exp(-t^2/2) dt.$$

$C = (H^H H)^{-1}$ is a covariance matrix of the noise after equalization, and $C_{i,i}$ can denote the (i,i)th element of C.

Similarly, the PEP for the LR-aided ZFD represented by Equation 2 given the "better" transformation matrix $\tilde{H}$ is represented by Equation 7.

$$P(z_i \to \hat{z}_i | \tilde{H}) = Q\left(\sqrt{\frac{|e_{z_i}|^2}{2\sigma_\omega^2 \tilde{C}_{i,i}}}\right) \quad \text{Equation 7}$$

In Equation 7, $e_{z_i} = z_i - \hat{z}_i$ and $\tilde{C} = (\tilde{H}^H \tilde{H})^{-1} = T^{-1} C (T^{-1})^H$. Because the PEP for the ith symbol $z_i$ is determined by $\tilde{C}_{i,i}$, the PEP performance of $z_i$ can be improved if the diagonal elements of $\tilde{C}$ are reduced by using a lattice-based method. Accordingly, in an exemplary embodiment of the present invention, the method further comprises generating a covariance matrix $\tilde{C}$ 115 and reducing one or more diagonal elements of the covariance matrix $\tilde{C}$ 120. Additionally, in some embodiments of the present invention, reducing diagonal elements of the covariance matrix $\tilde{C}$ can generate/update a unimodular transformation matrix T. The method can further comprise using the unimodular transformation matrix T to obtain an estimate of the input s 125.

As the SNR approaches infinity, for all the PEPs corresponding to the ith symbol, the one with the smallest $$\frac{|e_{z_i}|^2}{\tilde{C}_{i,i}}$$

or similarly, the largest $\tilde{C}_{i,i}$, is the dominant term on PEP. Thus, some embodiments of the present invention seek to generate a unimodular matrix T and minimize the diagonal elements of the covariance matrix $\tilde{C}$. Mathematically, this optimization method can be represented by Equation 8.

$$\begin{aligned} \min \quad & \max(\tilde{C}_{i,i}) \\ \text{s.t.} \quad & \tilde{C} = T^{-1} C (T^{-1})^H \end{aligned} \quad \text{Equation 8}$$

In Equation 8, $C = (H^H H)^{-1}$ is the covariance matrix after ZF equalization (The present invention is also applicable to other detectors, e.g. an minimum mean square error detector ("MMSE-D") in which $C = (H^H H + \sigma^2 I)^{-1}$). Solving the global optimal solution of Equation 8 can be a non-deterministic polynomial hard ("NP-hard") problem. Therefore, it can be impractical to solve Equation 8 globally.

Accordingly, exemplary embodiments of the present invention provide methods for finding a local optimal solution to Equation 8. In some embodiments of the present invention, one or more steps of in the method 100 are iterative.

For example, in each iteration, the method can reduce one of the diagonal elements of $\tilde{C}$ by choosing an index pair (i,k) and $\lambda_{i,k} \in Z + Zj$ updates the unimodular matrix $T' = (T^{-1})^H$ with the column-addition operation as shown in Equation 9.

$$t'_k \leftarrow t'_k + \lambda_{i,k} t'_i \quad \text{Equation 9:}$$

In Equation 9, $t'_k$ is the kth column of T'. The corresponding updates to the covariance matrix $\tilde{C}$ can be represented by Equation 10.

$$\tilde{c}_k \leftarrow \tilde{c}_k + \lambda_{i,k} \tilde{c}_i$$

$$\tilde{c}^{(k)} \leftarrow \tilde{c}^{(k)} + \lambda^*_{i,k} \tilde{c}^{(i)} \quad \text{Equation 10:}$$

In Equation 10, $\tilde{c}_k$ and $\tilde{c}^{(k)}$ are the kth column and kth row of $\tilde{C}$, respectively. In an exemplary embodiment of the present invention, for each iteration, the method 100 can also choose $\lambda_{i,k}$ as shown in Equation 11:

$$\lambda_{i,k} = -\left[\frac{\tilde{C}_{i,k}}{\tilde{C}_{i,i}}\right] \quad \text{Equation 11}$$

In Equation 11, the brackets [ ] are used to indicate a rounding function that rounds the real and imaginary parts to closest integer values. Thus, in an exemplary embodiment of the present invention, the reduced value for $\tilde{C}_{k,k}$ is shown in Equation 12.

$$R_{i,k} = -|\lambda_{i,k}|^2 \tilde{C}_{i,i} - \lambda^*_{i,k} \tilde{C}_{i,k} - \lambda_{i,k} \tilde{C}_{k,i} \geq 0 \quad \text{Equation 12:}$$

In some embodiments of the present invention, the method repeats these iterations of reducing a diagonal element to generate/update the unimodular matrix T' 120 so long as a diagonal element of the covariance matrix $\tilde{C}$ are reducible. In an exemplary embodiment of the present invention, a diagonal element $\tilde{C}_{k,k}$ of the covariance matrix is reducible if an only if there exists an i≠k, such that $\lambda_{i,k} \neq 0$ i.e. $R_{i,k} > 0$. In another exemplary embodiment of the present invention, a diagonal element $\tilde{C}_{k,k}$ is reducible if and only if there exists a reduced value of $\tilde{C}_{k,k}$, which is larger than a small value $\epsilon$, as shown in Equation 13.

$$R_{i,k} = -|\lambda_{i,k}|^2 \tilde{C}_{i,i} - \lambda^*_{i,k} \tilde{C}_{k,i} > \epsilon \quad \text{Equation 13:}$$

The present invention provides several strategies for selecting the index pair (i,k) for each iteration, and thus, which element of the covariance matrix will be reduced. In an exemplary embodiment of the present invention, reducing diagonal elements comprises reducing the largest reducible diagonal element of the covariance matrix (FIG. 2 provides exemplary pseudo code for this exemplary embodiment of the present invention). In another exemplary embodiment of the present invention, reducing diagonal elements comprises reducing the smallest reducible diagonal element of the covariance matrix. In yet another exemplary embodiment of the present invention, reducing diagonal elements comprises reducing a random reducible diagonal element of the covariance matrix. In still yet another exemplary embodiment of the present invention, reducing diagonal elements of the covariance matrix comprises reducing a reducible element of the covariance matrix that requires the least cost to be found. As those skilled in the art would understand, the "cost" can be determined many ways. In an exemplary embodiment of the present invention, the "cost" can be the number of arithmetic operations. In another exemplary embodiment of the present invention, the "cost" can be the number of clock cycles.

In addition to LR methods, various embodiments of the present invention provide LR systems. An exemplary embodiment of the present invention provides an LR system comprising a plurality of input terminals, a processor, and logic. The plurality of input terminals can be configured to obtain an input linearly transformed by a transformation matrix. The logic can be stored in memory. The memory can be many types of memory known in the art. In an exemplary embodiment of the present invention, the logic is stored in a non-transitory computer readable media. In various embodiments of the present invention, the processor can be configured to execute the logic. When executed, the logic can be configured cause the system to perform one or more of the steps of the exemplary lattice reduction methods described herein.

Figure 3A:
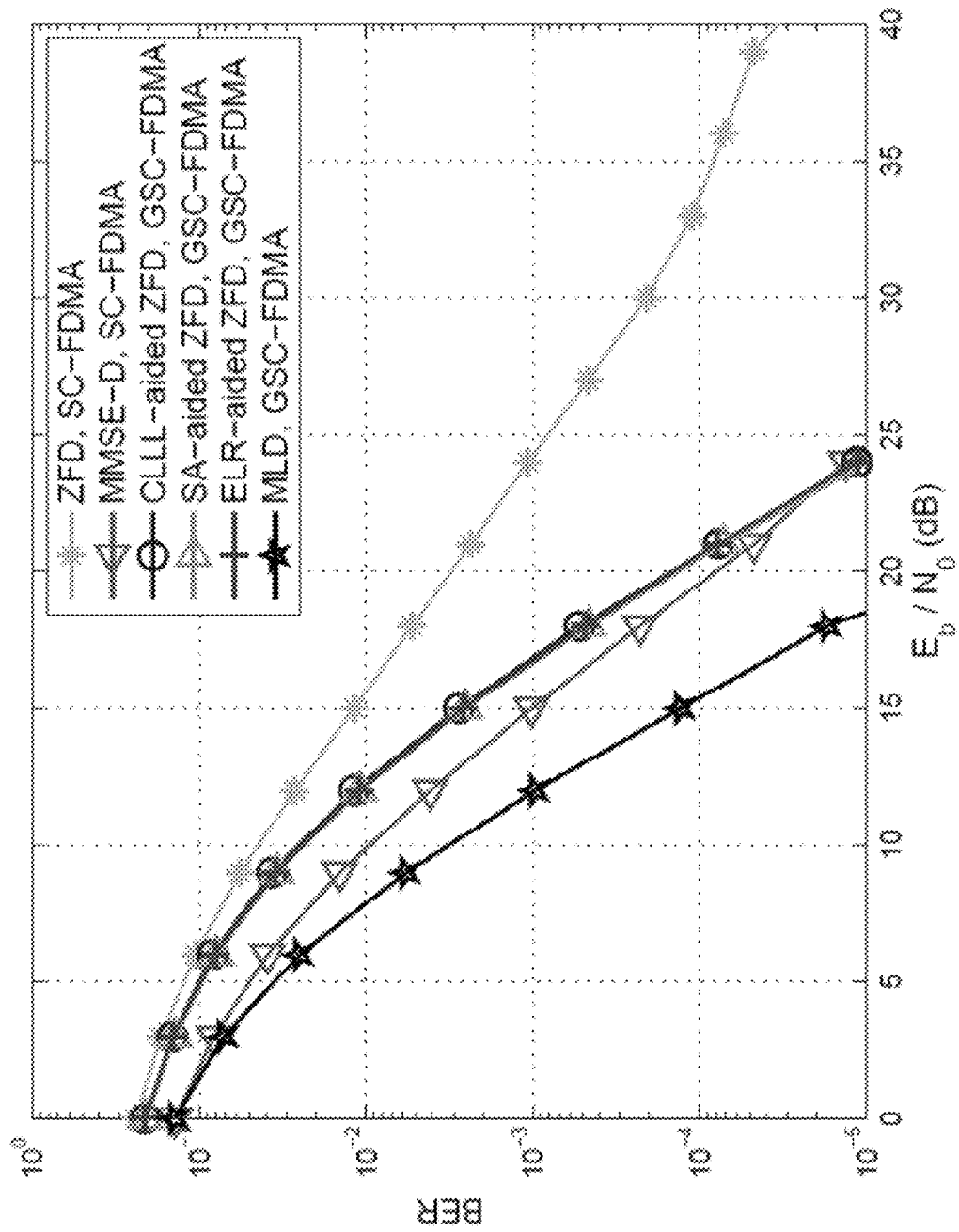
FIGS. 3A-3C provide plots of BER performance of conventional methods and an exemplary embodiment of the present invention.
Figure 3B:
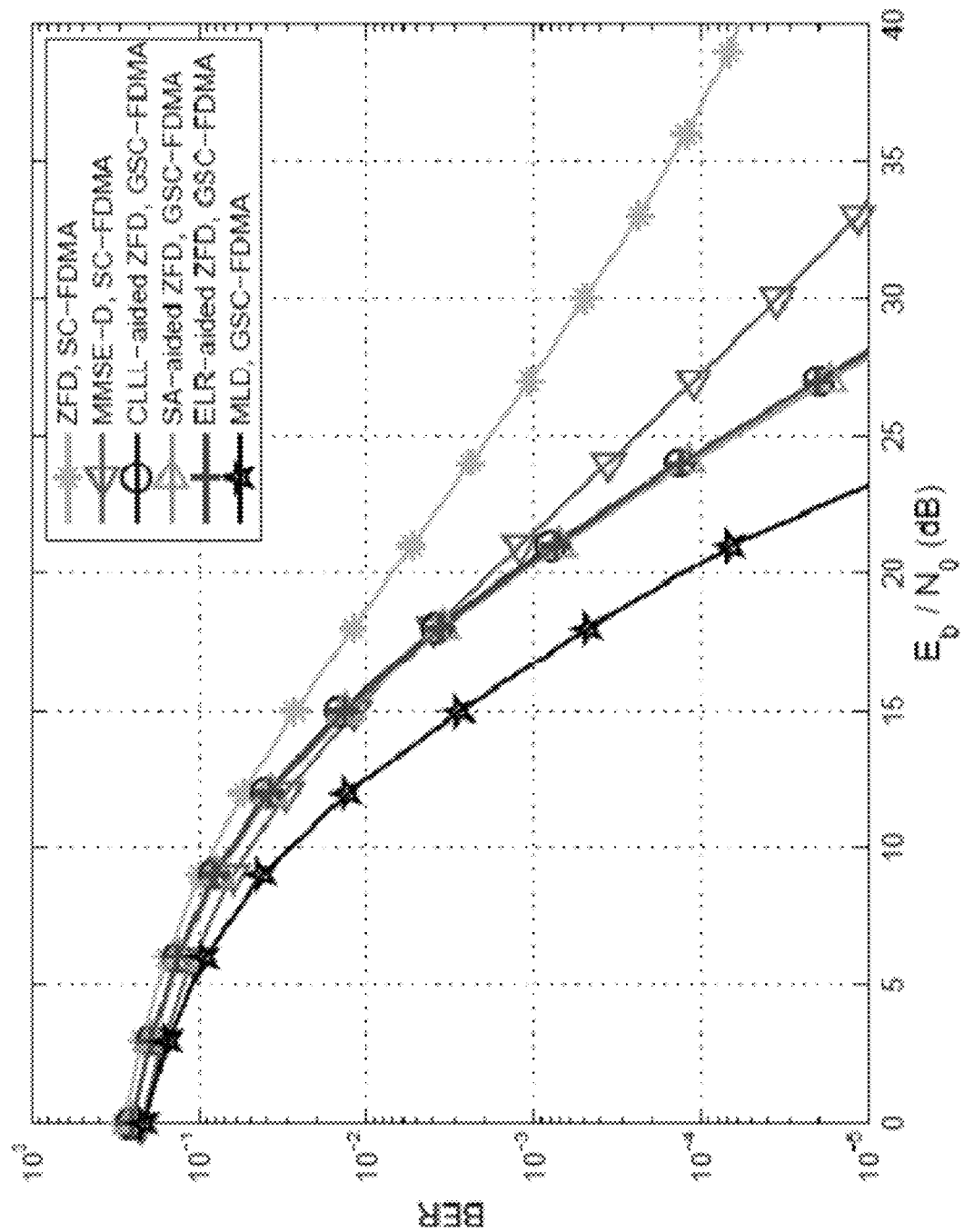
Figure 3C:
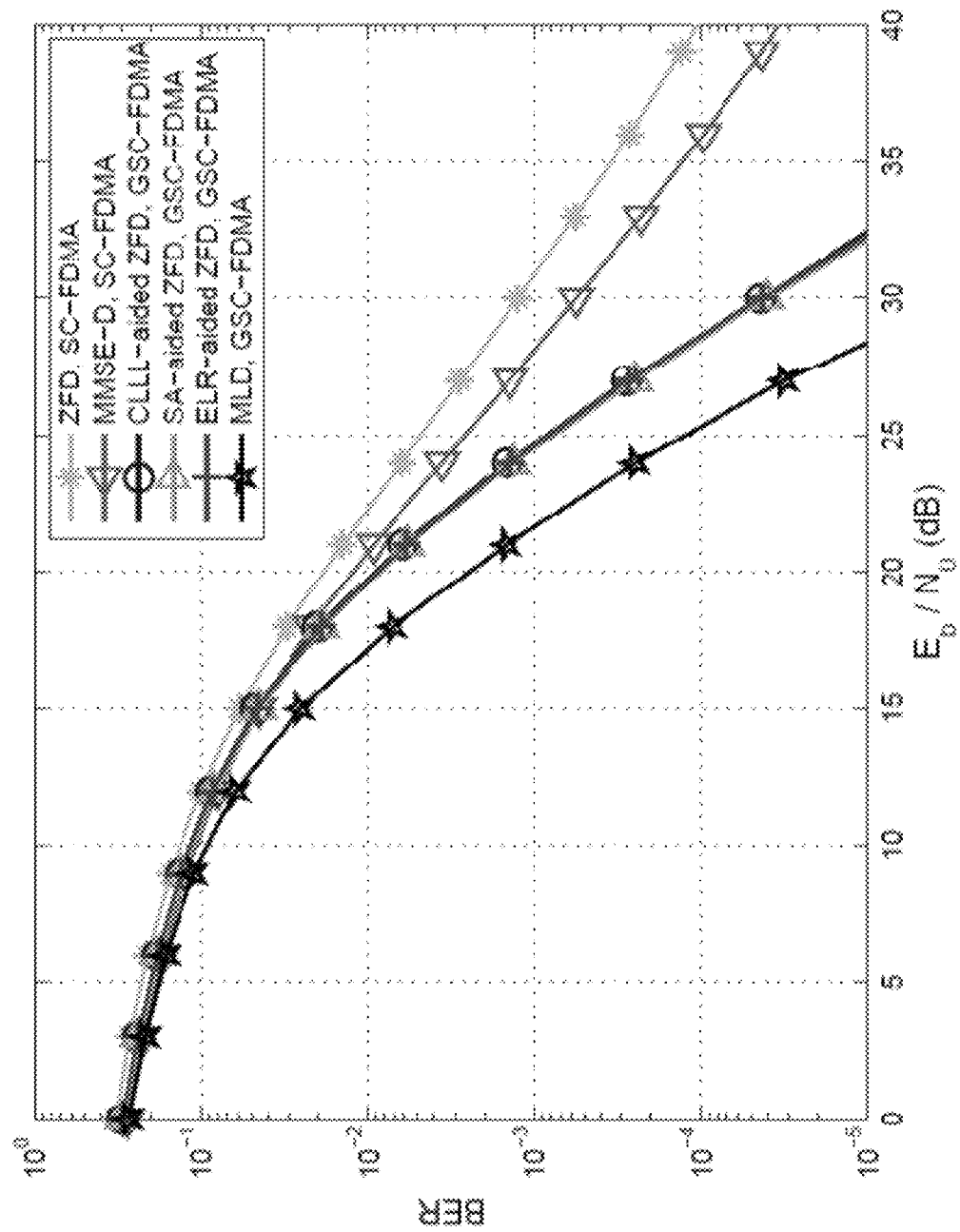

FIGS. 3A-3C depict the BER performance of a ZFD and MMSE-D for single carrier frequency division multiple access ("SC-FDMA") and LR-aided ZFDs for generalized SC-FDMA ("GSC-FDMA") with an exemplary LR system of the present invention, which is denoted by ELR-aided ZFD, GSC-FDMA, for 4-(FIG. 3A), 16-(FIG. 3B), and 64-(FIG. 3C) order quadrature amplitude modulation ("QAM") schemes. The performance of an MLD for GSC-FDMA is also plotted as a benchmark. For GSC-FDMA, the subcarriers for each user are divided into G=8 groups with each group having P=4 subcarriers. As shown, ZFD for SC-FDMA achieves diversity 1. At 4-QAM, the MMSE-D achieves higher order "diversity" from BER=$10^{-2}$ to $10^{-5}$ and obtains close performance to LR-aided ZFDs at BER=10-5. The MMSE-D, however, loses its advantage for 16-QAM and 64-QAM, where the diversity order 1 is clear in these two cases. The LR-aided ZFDs and the exemplary embodiment of the present invention have close performance to each other and achieve significant improvement relative to ZFD and superior performance to MMSE-D for 16-QAM and 64-QAM. Compared with MLD, however, there still exists a 5 to 10 dB gap at BER $10^{-5}$.

Figure 4:
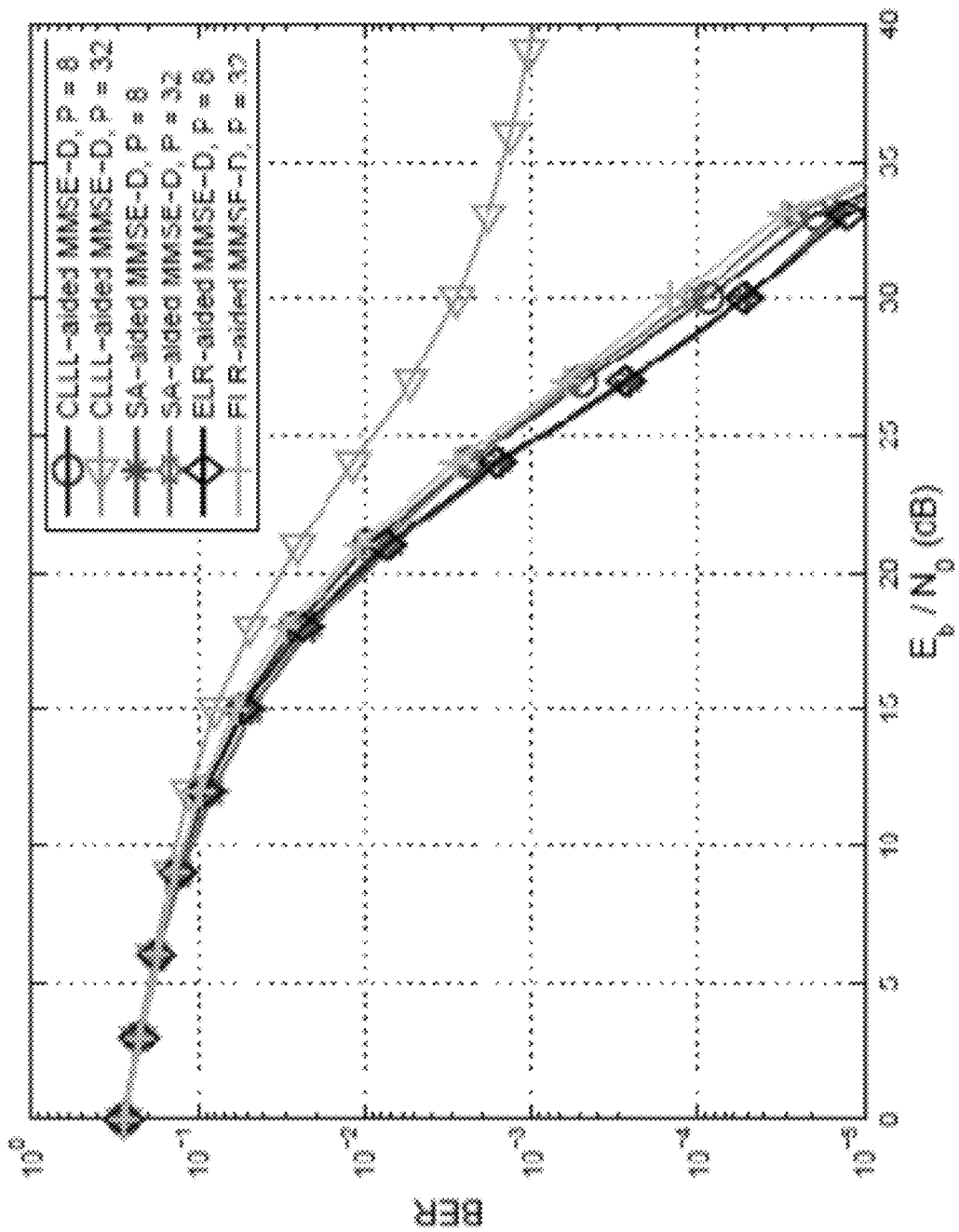
FIG. 4 provides plots of BER performance of conventional methods and an exemplary embodiment of the present invention.

FIG. 4 depicts the BER performance of a CLLL-aided MMSE-D, SA-aided MMSE-D, and exemplary embodiments of the present invention, which are denoted as ELR-aided MMSE-D, with different group sizes and 64-QAM. When the group size is P=8, all the MMSE-Ds exhibit similar performance. When the group size increases to P=32, the performance of the CLLL-aided MMSE-D becomes worse and has more than a 5 dB the gap to SA-aided MMSE-D at BER=$10^{-4}$. The exemplary embodiment of the present invention, ELR-aided MMSE-D, however, exhibits substantially similar performance to the SA-aided MMSE-D.

Figure 5:
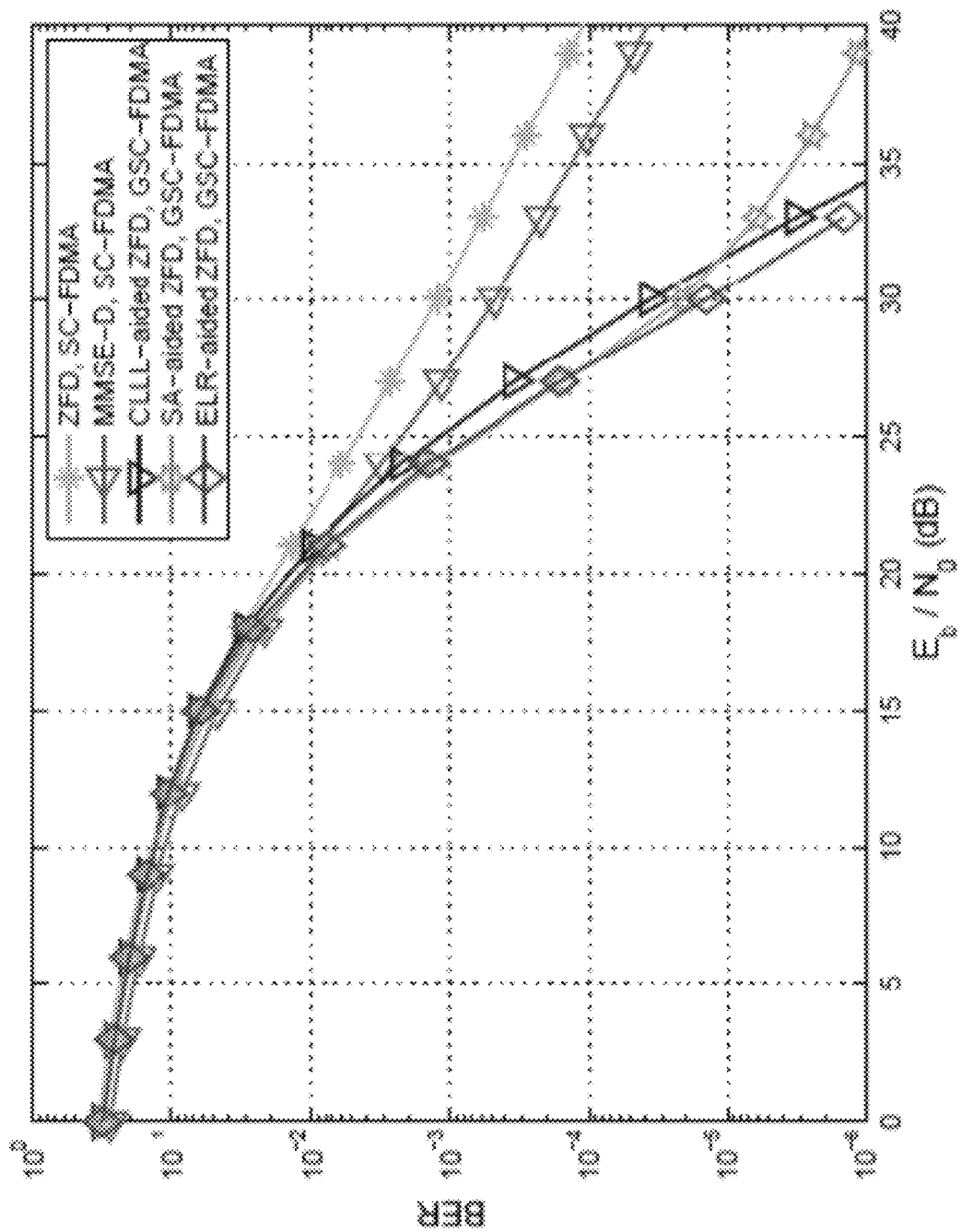
FIG. 5 provides plots of BER performance of conventional methods and an exemplary embodiment of the present invention.

FIG. 5 depicts the BER performance of a ZFD and MMSE-D for SC-FDMA, a CLLL-aided ZFD and SA-aided ZFD for GSC-FDMA, and an exemplary embodiment of the present invention, which is denoted by ELR-aided ZFD, for GSC-FDMA. In FIG. 5, L=8 channel taps, group size P=8, and 64-QAM. The exemplary embodiment of the present invention (ELR-aided ZFD) performs better than CLLL-aided ZFD and SA-aided ZFD, where the exemplary embodiment has about a 1.5 gain relative to CLLL-aided and SA-aided at BER=$10^{-5}$. Further, as the SNR increases, the performance of SA-aided ZFD degrades, and the gap to the exemplary embodiment of the present invention increases to about 10 dB at BER=$10^{-6}$.

Figure 6:
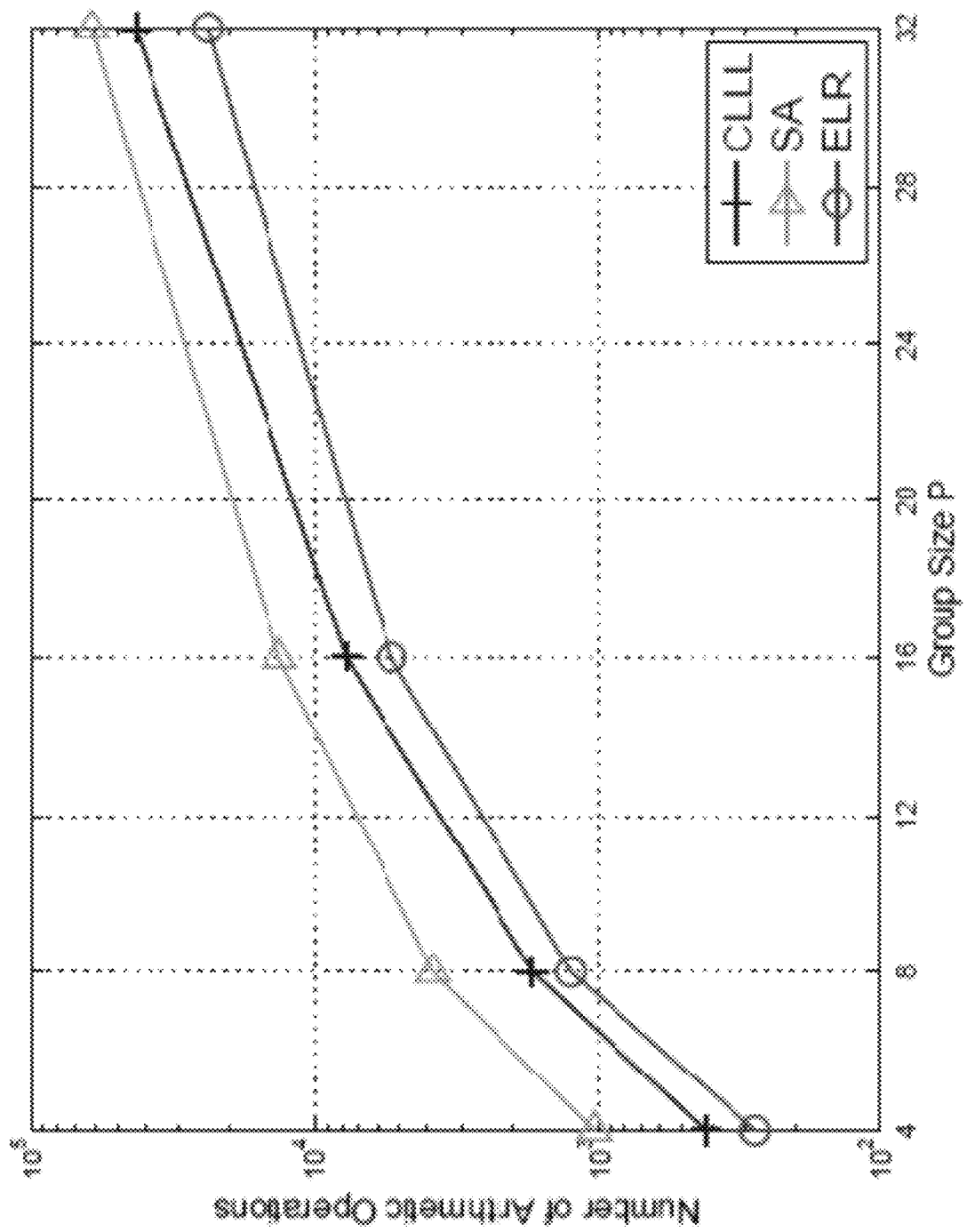
FIG. 6 provides plots of the average number of arithmetic operations for basis updates in conventional methods and an exemplary embodiment of the present invention.

Various embodiments of the present invention also provide LR systems and methods with lower complexity than conventional systems and methods. Table 1 (below) and FIG. 6 summarize the average number of basis update iterations and number of arithmetic operations (real additions and real multiplications) for basis updates, respectively, for a CLLL method, an SA method, and an exemplary embodiment of the present invention (denoted by ELR), in GSC-FDMA channel with L=4. The CLLL algorithm has the highest number of basis updates of all three LR methods. Compared with CLLL, the exemplary embodiment of the present invention uses fewer updates and SA exhibits the lowest bases updates among the three LR methods. When it comes to the number of arithmetic operations, however, SA has a higher number of operations than either CLLL or ELR. This is because SA requires (128n−18) arithmetic operations per basis update, which is much higher than CLLL or ELR. The exemplary embodiment of the present invention (ELR) uses (31n−7) arithmetic operations per basis update, including (16n+8) to update $\lambda_{i,k}$ and $R_{i,k}$. The exemplary embodiment of the present invention (ELR) achieves the lowest complexity with respect to the number of arithmetic operations for basis updates.

TABLE 1

| Group Size | 4 | 8 | 16 | 32 |
|---|---|---|---|---|
| CLLL | 3.25 | 9.39 | 29.56 | 101.42 |
| SA | 2.09 | 3.79 | 6.56 | 15.02 |
| ELR | 2.37 | 5.17 | 10.92 | 24.12 |

Figure 7:
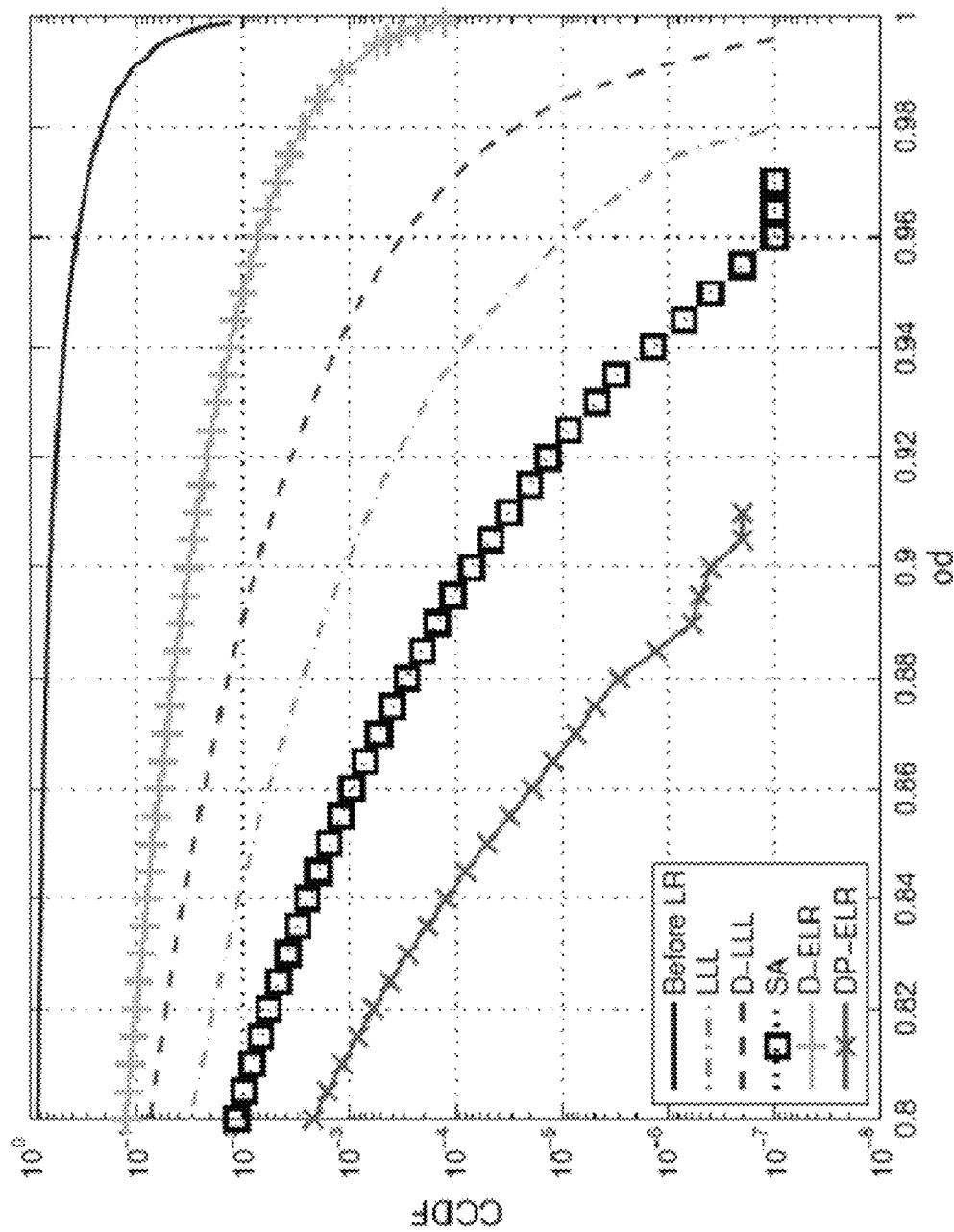
FIG. 7 provides plots of CCDF of od(H) and od($\tilde{H}$) for MIMO systems with N=M=4 for conventional methods and an exemplary embodiment of the present invention.
Figure 8:
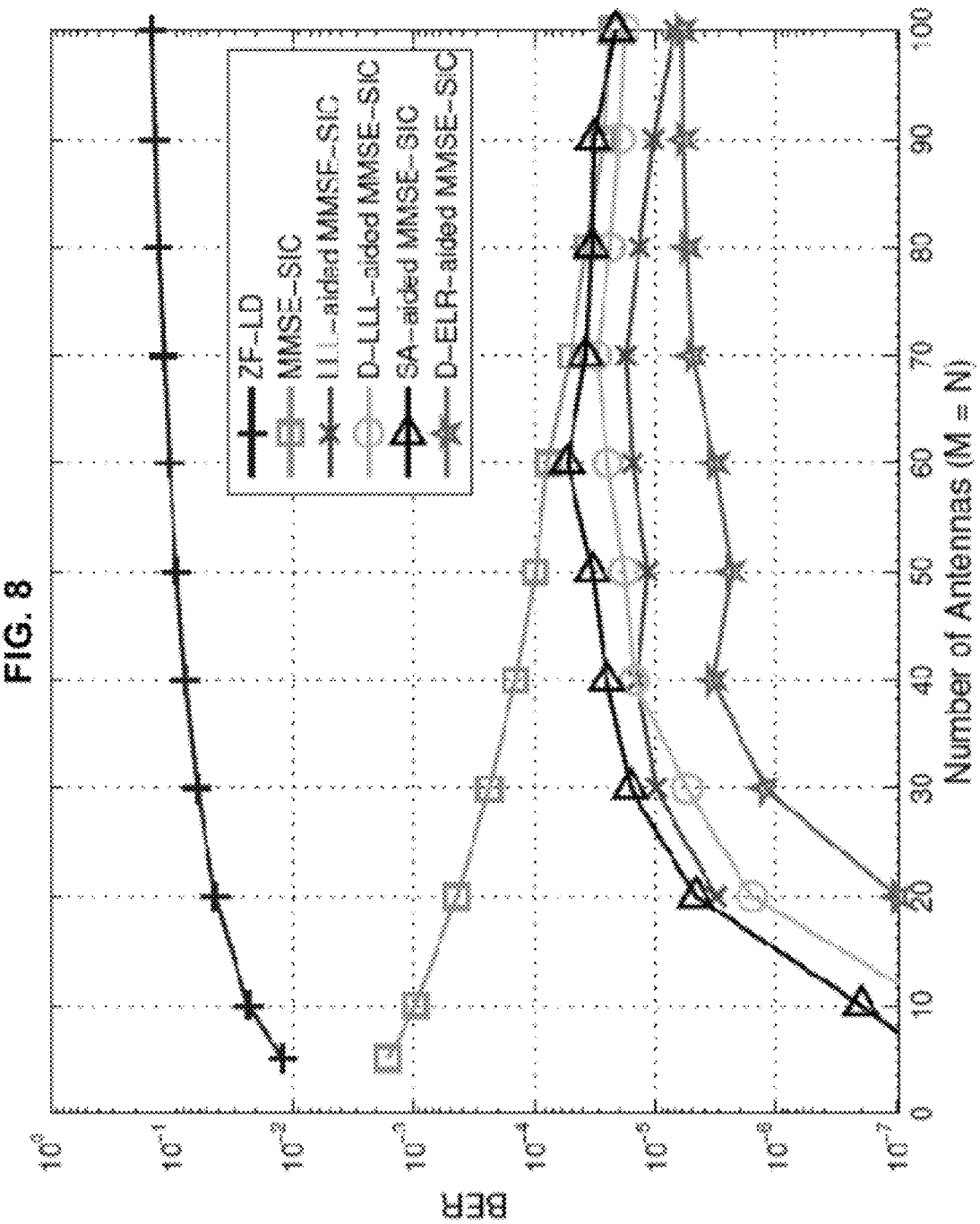
FIG. 8 provides plots indicating performance comparisons of conventional methods and an exemplary embodiment of the present invention in MIMO systems with 4QAM, SNR=20 dB, and different numbers of antennas.
Figure 9:
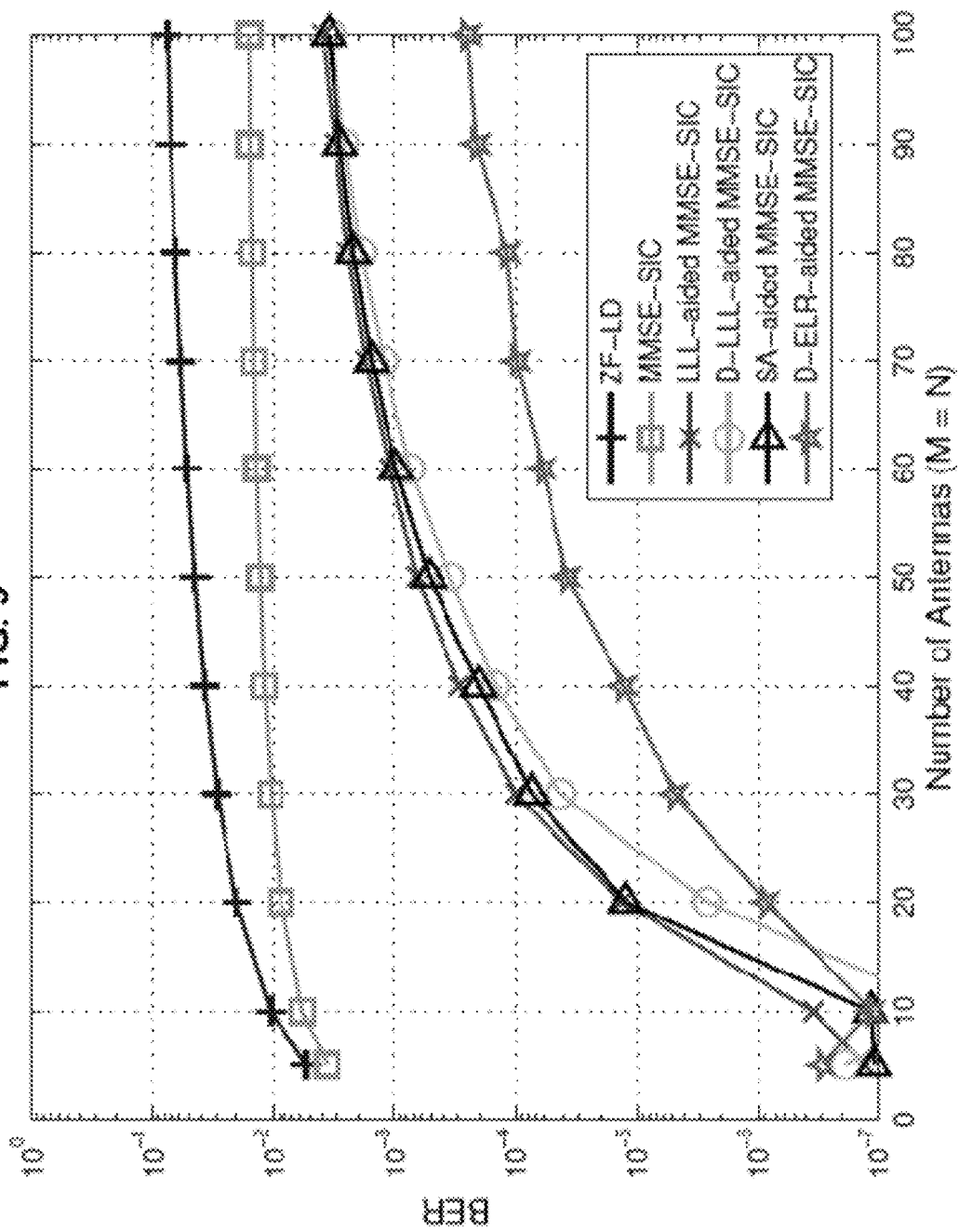
FIG. 9 provides plots indicating performance comparisons of conventional methods and an exemplary embodiment of the present invention in MIMO systems with 64QAM, SNR=30 dB, and different numbers of antennas.
Figure 10:
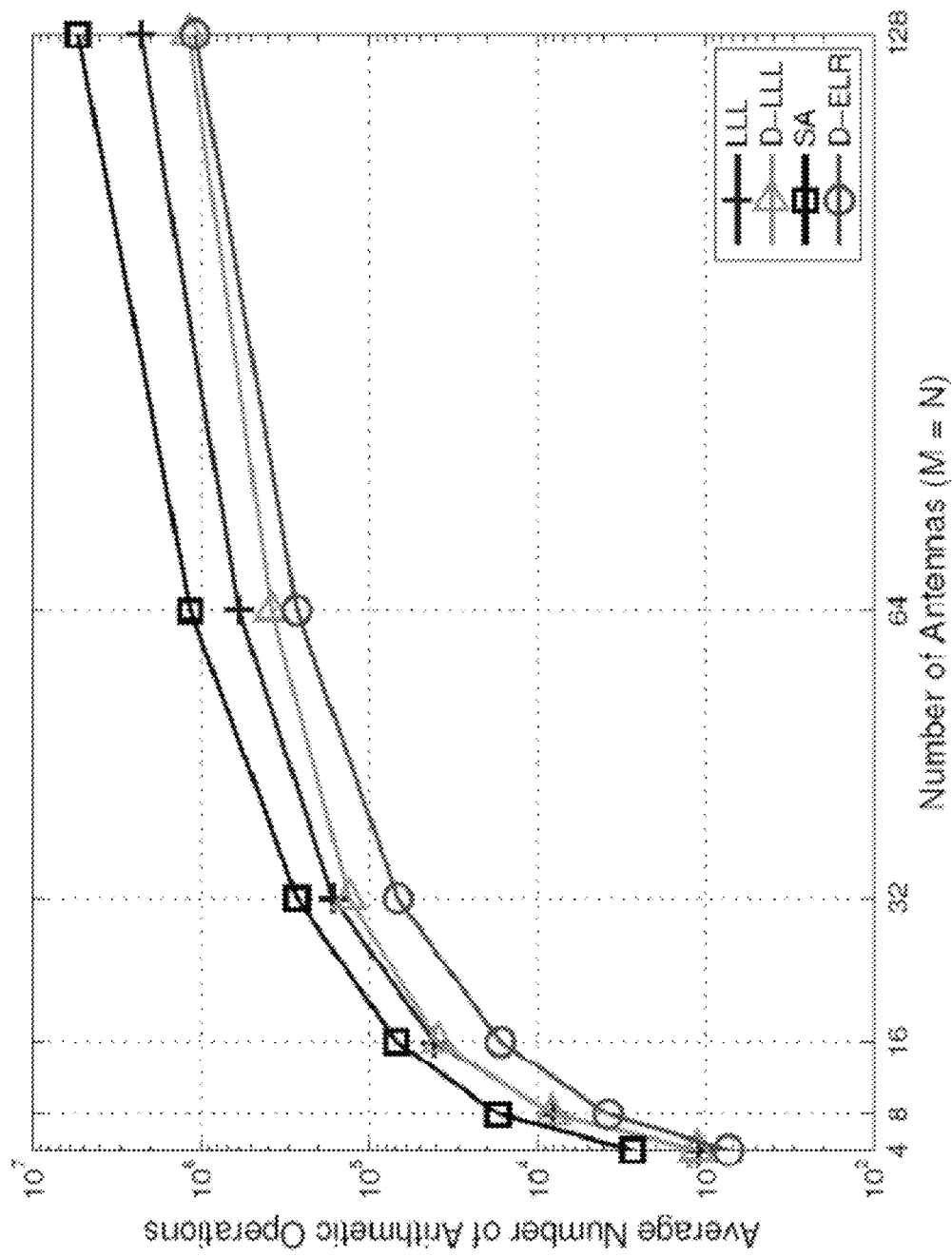
FIG. 10 provides plots of the average number of basis updates for conventional methods and an exemplary embodiment of the present invention in MIMO systems with different numbers of antennas.
Figure 11:
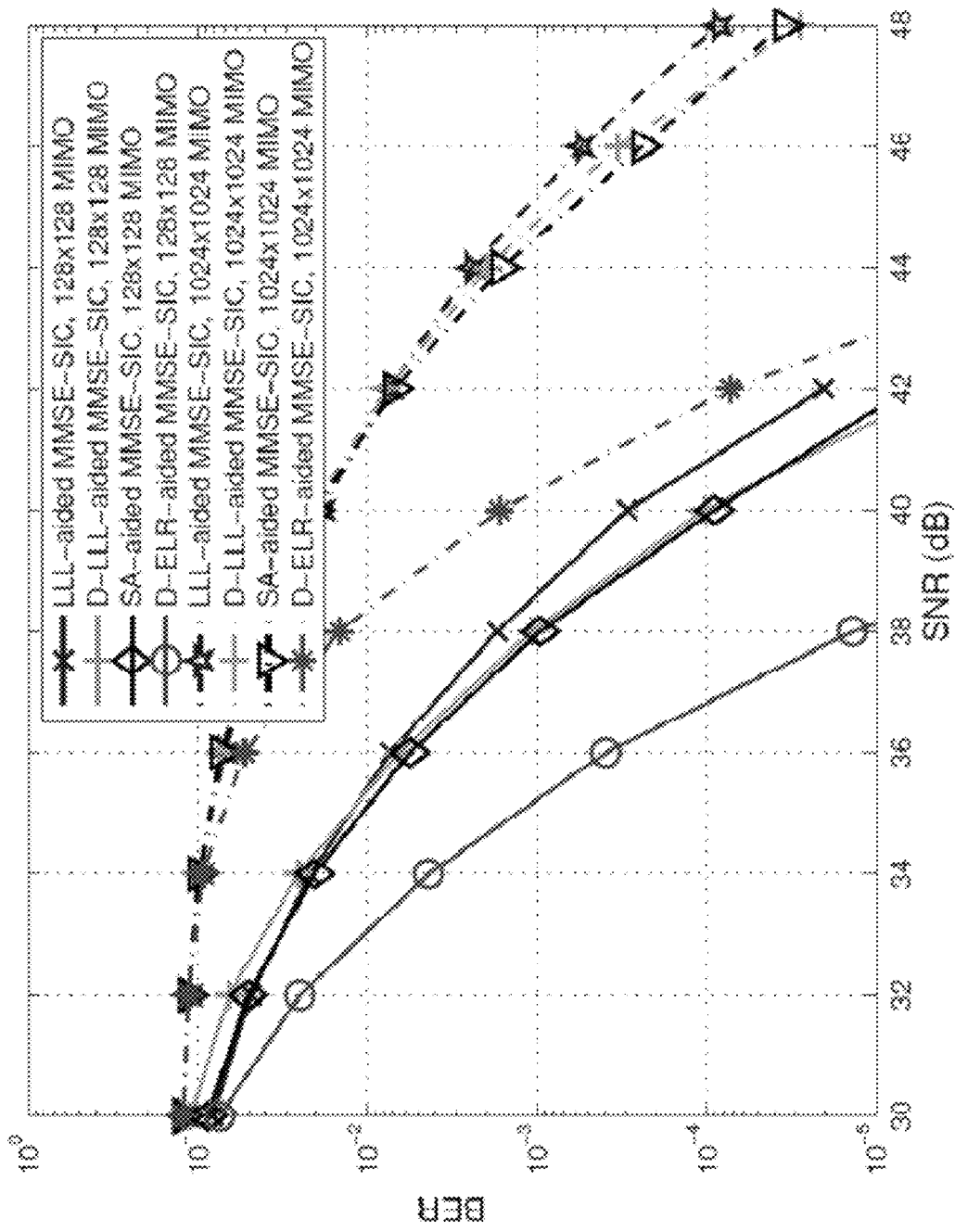
FIG. 11 provides plots indicating performance comparisons of conventional methods and an exemplary embodiment of the present invention in MIMO systems with 256QAM.
Figure 12:
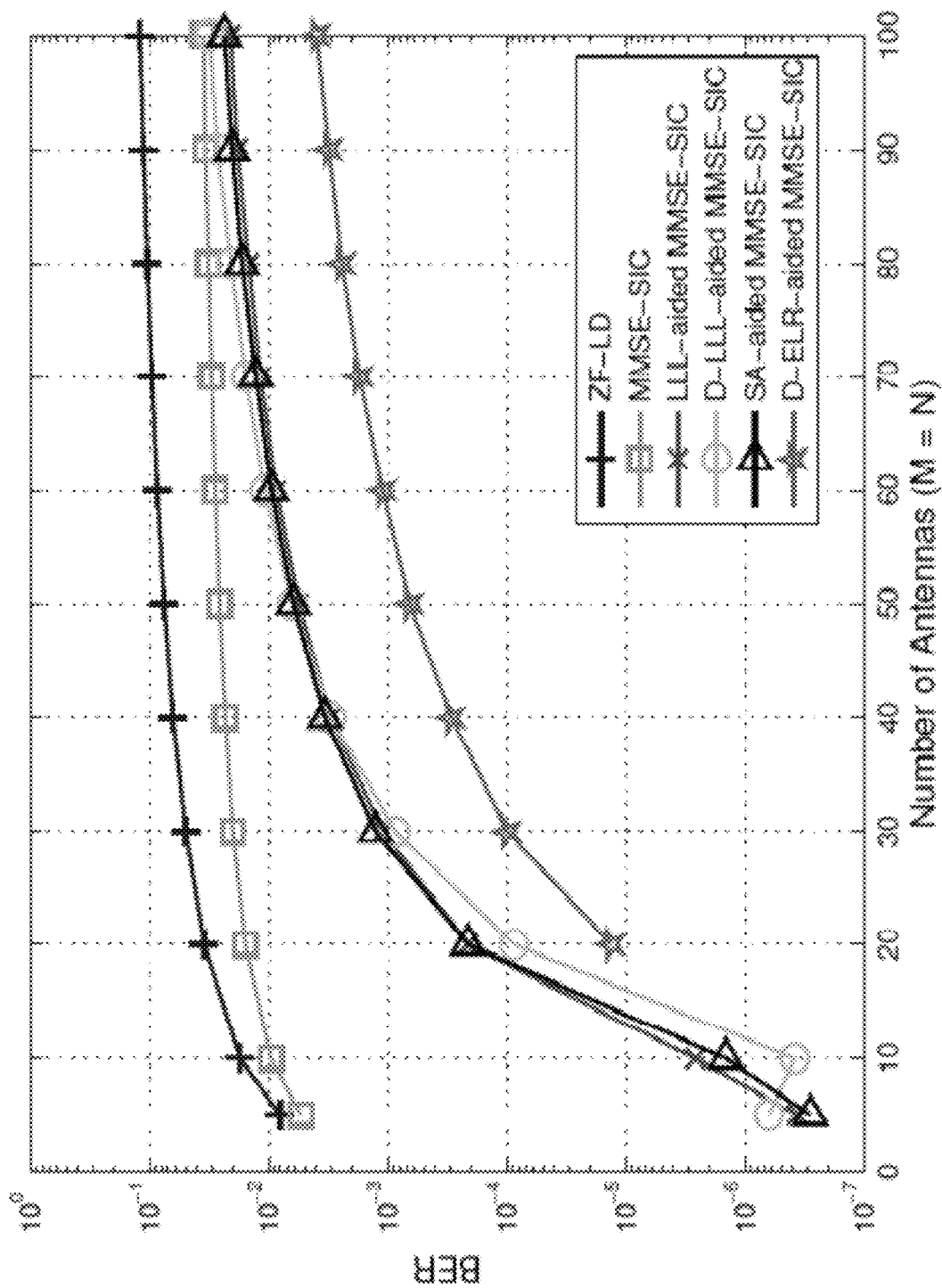
FIG. 12 provides plots indicating performance comparisons of conventional methods and an exemplary embodiment of the present invention in MIMO systems with 64QAM, SNR=30 dB, and different numbers of antennas.
Figure 13:
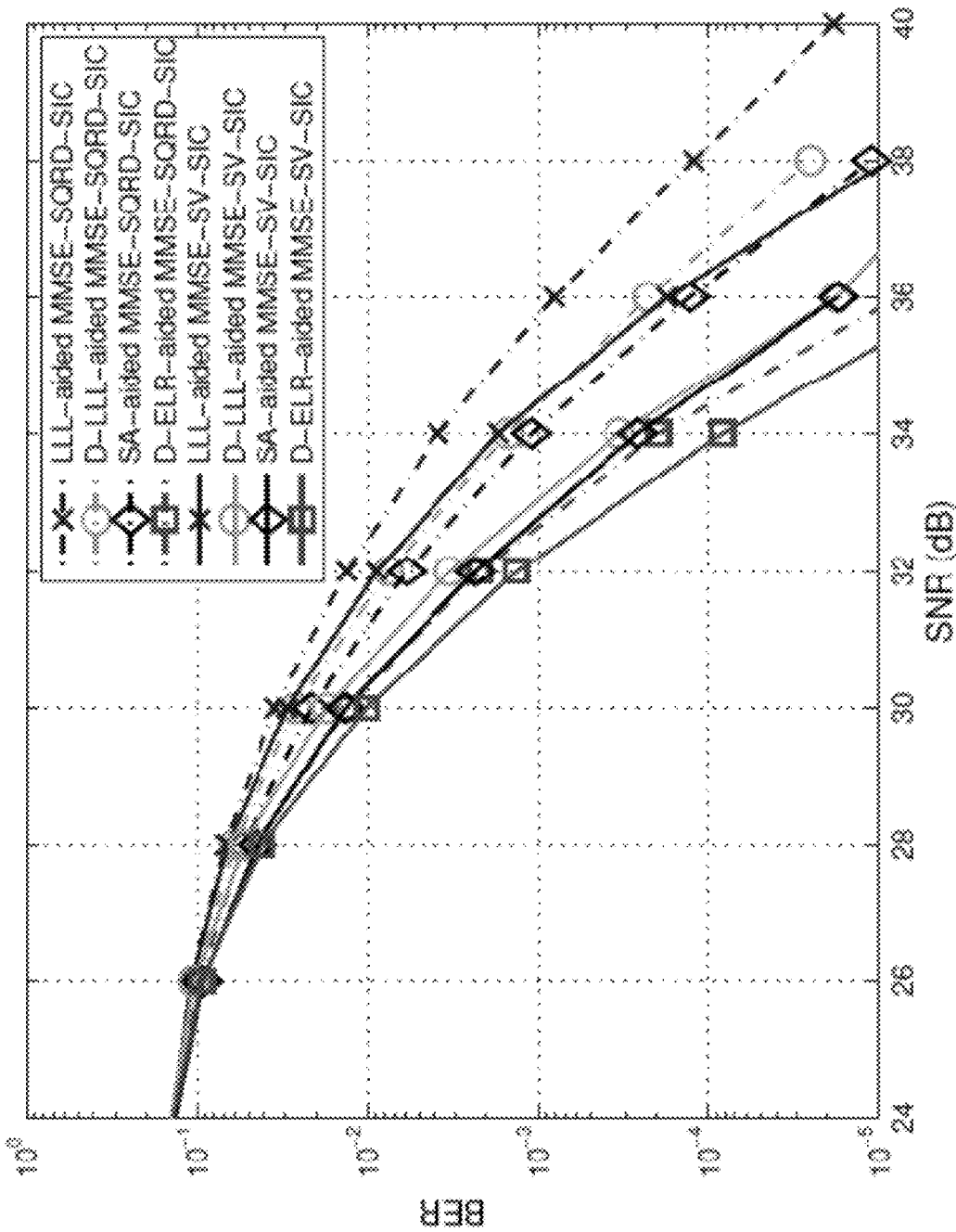
FIG. 13 provides plots indicating performance comparisons of conventional methods and an exemplary embodiment of the present invention in MIMO systems with M=N=64 and 256QAM.
Figure 14:
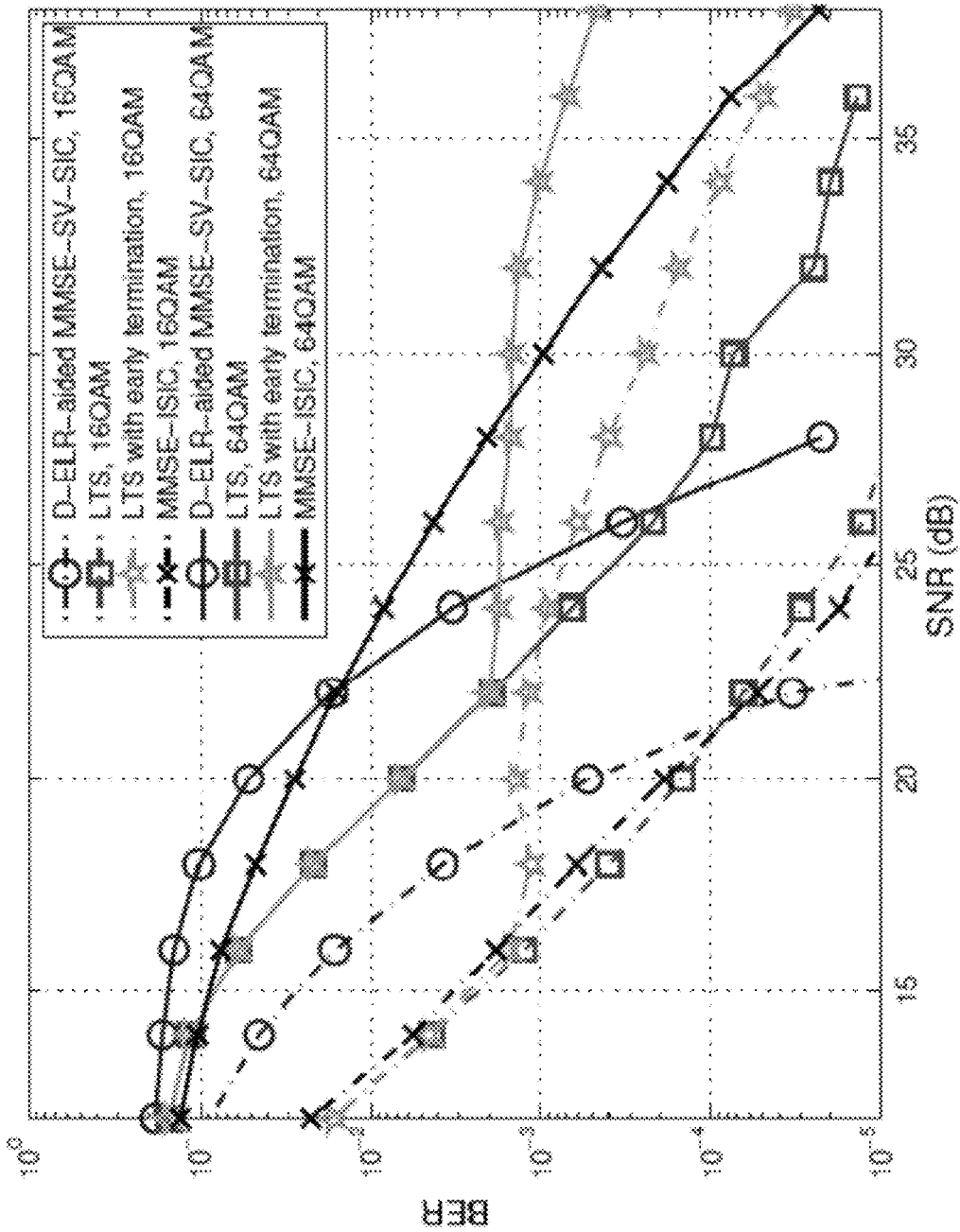
FIG. 14 provides plots indicating performance comparisons of conventional methods and an exemplary embodiment of the present invention in MIMO systems with M=N=32 and different constellation sizes.
Figure 15:
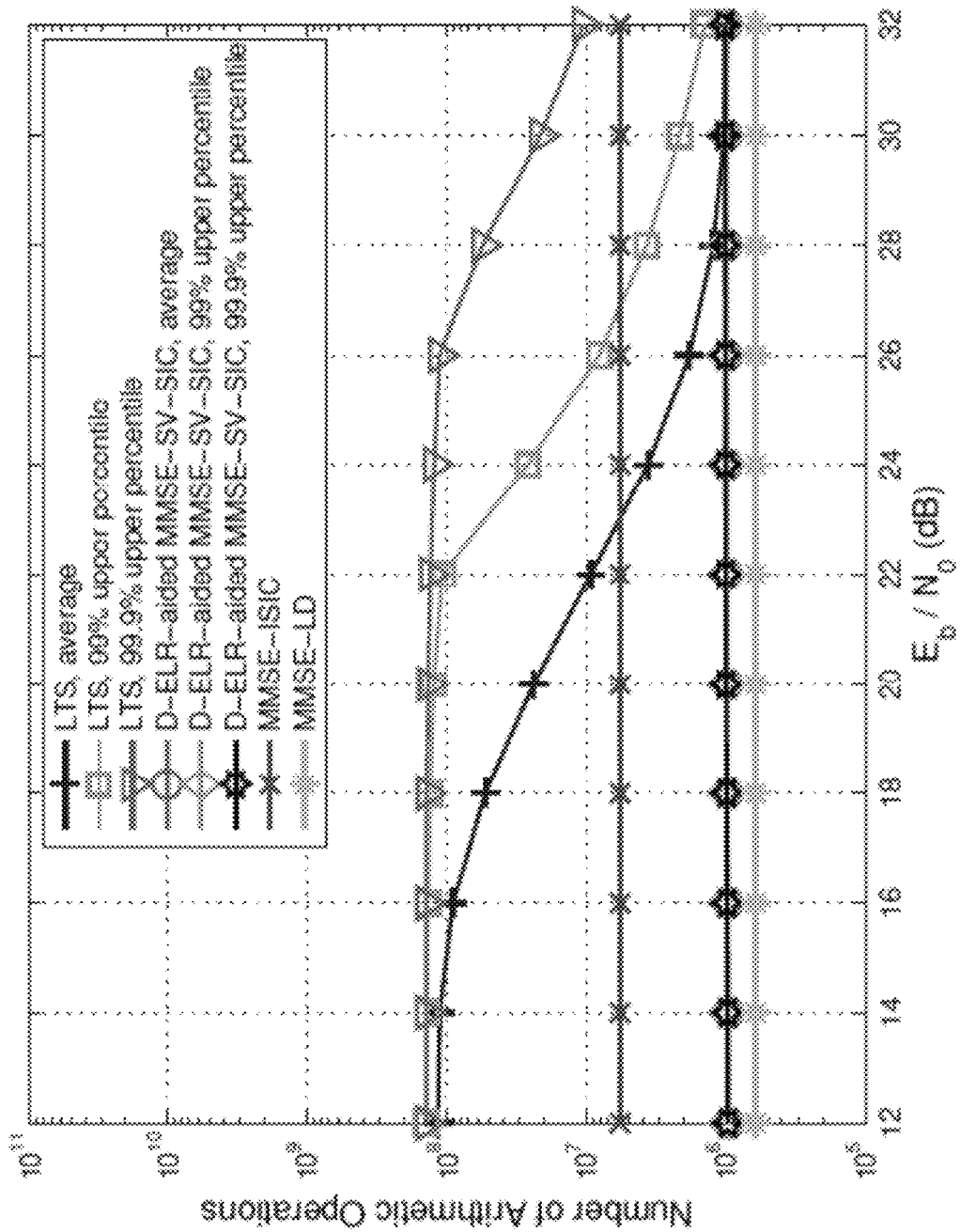
FIG. 15 provides plots indicating performance comparisons of conventional methods and an exemplary embodiment of the present invention in MIMO systems with M=N=32, 64QAM, and different SNRs.

FIGS. 7-15 illustrates performance comparisons between conventional systems and methods and exemplary embodiments of the present invention (denoted by D-ELR, D-ELR-aided MMSE-SIC, D-ELR-aided MMSE-SIC, and D-ELR-aided MMSE-SV-SIC) in various MIMO systems. FIG. 7 provides plots of CCDF of od(H) and od(H̃) in MIMO systems with N=M=4 for conventional methods and an exemplary embodiment of the present invention. FIG. 8 provides plots indicating performance comparisons of conventional methods and an exemplary embodiment of the present invention in MIMO systems with 4QAM, SNR=20 dB, and different numbers of antennas. FIG. 9 provides plots indicating performance comparisons of conventional methods and an exemplary embodiment of the present invention in MIMO systems with 64QAM, SNR=30 dB, and different numbers of antennas. FIG. 10 provides plots of the average number of basis updates for conventional methods and an exemplary embodiment of the present invention in MIMO systems with different numbers of antennas. FIG. 11 provides plots indicating performance comparisons of conventional methods and an exemplary embodiment of the present invention in MIMO systems with 256QAM. FIG. 12 provides plots indicating performance comparisons of conventional methods and an exemplary embodiment of the present invention in MIMO systems with 64QAM, SNR=30 dB, and different numbers of antennas. FIG. 13 provides plots indicating performance comparisons of conventional methods and an exemplary embodiment of the present invention in MIMO systems with M=N=64 and 256QAM. FIG. 14 provides plots indicating performance comparisons of conventional methods and an exemplary embodiment of the present invention in MIMO systems with M=N=32 and different constellation sizes. FIG. 15 provides plots indicating performance comparisons of conventional methods and an exemplary embodiment of the present invention in MIMO systems with M=N=32, 64QAM, and different SNRs.

Table 2 (below) summarizes the average number of basis updates for an LLL method, a D-LLL method, an SA method, and an exemplary embodiment of the present invention (denoted by D-ELR), in for an exemplary MIMO system.

TABLE 2

| | N = M | | | | | |
|---|---|---|---|---|---|---|
| | 4 | 8 | 16 | 32 | 64 | 128 |
| LLL | 6.70 | 29.19 | 97.24 | 248.91 | 561.94 | 1272.03 |
| D-LLL | 7.39 | 34.37 | 103.37 | 208.66 | 390.76 | 766.34 |
| SA | 5.50 | 16.98 | 33.85 | 65.87 | 141.68 | 329.30 |
| D-ELR | 5.27 | 14.82 | 32.90 | 67.90 | 135.52 | 272.77 |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A method of estimating an input in a MIMO communication system comprising:
    receiving a transmitted signal at a plurality of antennas, the signal containing the input, linearly transformed by a channel matrix;
    calculating, by a processor, a preliminary estimate of the channel matrix;
    generating, by a processor, a covariance matrix based on the preliminary estimate of the channel matrix;
    generating, by the processor, a unimodular transformation matrix by reducing diagonal elements of the covariance matrix $\tilde{C}$;
    obtaining, by the processor, an estimate of the input by applying the unimodular transformation matrix to the received signal;
    detecting a quadrature amplitude modulation (QAM) symbol using the estimate of the input; and
    outputting an output signal corresponding to the QAM symbol,
    wherein reducing diagonal elements of the covariance matrix comprises selecting an index pair (i,k) and updating a corresponding $k^{th}$ column and $k^{th}$ row of the covariance matrix according to $$\lambda_{i,k} = -\left[\frac{\tilde{C}_{i,k}}{\tilde{C}_{i,i}}\right],$$

wherein $\tilde{C}_{i,k}$ and $\tilde{C}_{i,i}$ are elements of the covariance matrix.

2. The method of claim 1 further comprising repeating the step of reducing the diagonal elements until the diagonal elements of the covariance matrix are not reducible.

3. The method of claim 1, wherein reducing diagonal elements of the covariance matrix comprises reducing a largest reducible diagonal element of the covariance matrix.

4. The method of claim 1, wherein reducing diagonal elements of the covariance matrix comprises reducing a smallest reducible diagonal element of the covariance matrix.

5. The method of claim 1, wherein reducing diagonal elements of the covariance matrix comprises reducing a random reducible diagonal element of the covariance matrix.

6. The method of claim 1, wherein reducing diagonal elements of the covariance matrix comprises reducing a reducible diagonal element of the covariance matrix requiring the least costs to be found.

7. The method of claim 1, wherein reducing diagonal elements of the covariance matrix comprises an iterative process.

8. The method of claim 1, wherein obtaining a preliminary estimate of the transformation matrix comprises obtaining data from a memory.

9. A MIMO communication system comprising:
    a plurality of antennas configured to receive a transmitted signal, the signal containing an input linearly transformed by a channel matrix;
    a processor; and
    logic stored in a non-transitory computer readable media that, when executed by the processor, is configured to:
        calculate a preliminary estimate of the channel matrix;
        generate a covariance matrix based on the preliminary estimate of the channel matrix;
        generate a unimodular transformation matrix by reducing diagonal elements of the covariance matrix;
        obtain an estimate of the input by applying the unimodular transformation matrix to the received signal;
        detect a quadrature amplitude modulation (QAM) symbol using the estimate of the input; and
        output an output signal corresponding to the QAM symbol,
    wherein reducing diagonal elements of the covariance matrix comprises selecting an index pair (i,k) and updating a corresponding $k^{th}$ column and $k^{th}$ row of the covariance matrix according to $$\lambda_{i,k} = -\left[\frac{\tilde{C}_{i,k}}{\tilde{C}_{i,i}}\right],$$

wherein $\tilde{C}_{i,k}$ and $\tilde{C}_{i,i}$ are elements of the covariance matrix.

10. The system of claim 9, wherein the logic is further configured to repeat the step of reducing diagonal elements of the covariance matrix until the diagonal elements are not reducible.

11. The system of claim 9, wherein the logic is further configured to reduce diagonal elements of the covariance matrix by reducing a largest reducible diagonal element of the covariance matrix.

12. The system of claim 9, wherein the logic is further configured to reduce diagonal elements of the covariance matrix by reducing a smallest reducible diagonal element of the covariance matrix.

13. The system of claim 9, wherein the logic is further configured to reduce diagonal elements of the covariance matrix by reducing a random reducible diagonal element of the covariance matrix.

14. The system of claim 9, wherein the logic is further configured to reduce diagonal elements of the covariance matrix by reducing a reducible diagonal element of the covariance matrix requiring the least costs to be found.

15. The system of claim 9, wherein the logic is further configured to reduce diagonal elements of the covariance matrix by iteratively reducing at least one diagonal element of the covariance matrix.

16. A non-transitory computer-readable medium storing computer executable instructions that, when executed by one or more computing devices, configure the one or more computing devices to perform operations comprising:
  receiving a transmitted signal at a plurality of antennas of a MIMO communication system, the signal containing an input linearly transformed by a channel matrix;
  obtaining, by a processor, a preliminary estimate of the channel matrix;
  generating, by a processor, a covariance matrix based on the preliminary estimate of the channel matrix;
  generating, by a processor, a unimodular transformation matrix by reducing diagonal elements of the covariance matrix;
  obtaining, by a processor, an estimate of the input by applying the unimodular transformation matrix to the received signal;
  detecting a quadrature amplitude modulation (QAM) symbol using the estimate of the input; and
  outputting an output signal corresponding to the QAM symbol,
  wherein reducing diagonal elements of the covariance matrix comprises selecting an index pair (i,k) and updating a corresponding $k^{th}$ column and $k^{th}$ row of the covariance matrix according to $$\lambda_{i,k} = -\left\lceil \frac{\tilde{C}_{i,k}}{\tilde{C}_{i,i}} \right\rfloor,$$

wherein $\tilde{C}_{i,k}$ and $\tilde{C}_{i,i}$ are elements of the covariance matrix.

17. The non-transitory computer-readable medium of claim 16 further comprising repeating the step of reducing the diagonal elements until the diagonal elements of the covariance matrix are not reducible.

18. The non-transitory computer-readable medium of claim 16, wherein reducing diagonal elements of the covariance matrix comprises reducing a random reducible diagonal element of the covariance matrix.

19. The non-transitory computer-readable medium of claim 16, wherein reducing diagonal elements of the covariance matrix comprises reducing a reducible diagonal element of the covariance matrix requiring the least costs to be found.

20. The non-transitory computer-readable medium of claim 16, wherein reducing diagonal elements of the covariance matrix comprises an iterative process.

* * * * *